(12) United States Patent
Fukase

(10) Patent No.: US 9,253,726 B2
(45) Date of Patent: Feb. 2, 2016

(54) WIRELESS COMMUNICATION APPARATUS

(71) Applicant: KABUSHIKI KAISHA TOSHIBA, Minato-ku, Tokyo (JP)

(72) Inventor: Shinichi Fukase, Saitama-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 340 days.

(21) Appl. No.: 13/757,138

(22) Filed: Feb. 1, 2013

(65) Prior Publication Data

US 2013/0244581 A1    Sep. 19, 2013

(30) Foreign Application Priority Data

Mar. 19, 2012   (JP) ................. 2012-061937

(51) Int. Cl.
*H04B 7/00*     (2006.01)
*H04W 52/02*   (2009.01)

(52) U.S. Cl.
CPC ................. *H04W 52/0235* (2013.01)

(58) Field of Classification Search
CPC ............................................... H04W 52/0235
USPC .......... 455/66.1, 67.11, 67.13, 68, 345, 575.9
See application file for complete search history.

(56) References Cited

U.S. PATENT DOCUMENTS

| 5,036,543 A * | 7/1991 | Ueno ............................... 381/13 |
| 2005/0048929 A1 * | 3/2005 | Ogino ........................... 455/90.1 |
| 2005/0185737 A1 * | 8/2005 | Yamauchi ..................... 375/316 |
| 2007/0191998 A1 * | 8/2007 | Arie et al. ......................... 701/2 |
| 2009/0102634 A1 | 4/2009 | Okada et al. |

FOREIGN PATENT DOCUMENTS

| CN | 1225763 A |   | 8/1999 |
| JP | 09261740 A |   | 10/1997 |
| JP | 10-155187 | * | 6/1998 |
| JP | 10155187 A |   | 6/1998 |
| JP | 2006108981 | * | 4/2006 |
| JP | 2008-160407 A |   | 7/2008 |
| JP | 2009097272 A |   | 5/2009 |

(Continued)

OTHER PUBLICATIONS

Chinese Office Action dated Nov. 3, 2014, issued in counterpart Chinese Application No. 201310087418.6.

(Continued)

*Primary Examiner* — Yuwen Pan
*Assistant Examiner* — Fatuma Sherif
(74) *Attorney, Agent, or Firm* — Holtz, Holtz & Volek PC

(57) ABSTRACT

According to an embodiment, the control unit produces a first control signal and a second control signal. The first control signal is to set an intermittent reception period. The second control signal is to control a start-up of reception of a wireless signal. When the reception processing is implemented during the intermittent reception period, the RF unit stops in accordance with an instruction of the control unit after the reception processing signal is outputted, the intermittent reception period is awoken. When the reception processing exceeds the intermittent reception period, the RF unit continues the reception, and stops in accordance with the instruction of the control unit after the reception processing signal is outputted.

13 Claims, 12 Drawing Sheets

(56) References Cited

FOREIGN PATENT DOCUMENTS

| | | |
|---|---|---|
| JP | 2011-226222 A | 11/2011 |
| JP | 2011-254159 A | 12/2011 |

OTHER PUBLICATIONS

Japanese Office Action dated Aug. 1, 2014 issued in counterpart Japanese Application No. 2012-061937.

* cited by examiner

| Spre1 (PREAMBLE DETECTION) | Snd1 (NOISE DETECTION) | Srs1 (RSSI DETECTION) | Sen1 (OUTPUT OF JUDGMENT UNIT) |
|---|---|---|---|
| EXISTENCE OF SIGNAL | / | / | EXISTENCE OF SIGNAL |
| UNDER DETECTION | / | / | UNDER DETECTION |
| OFF | EXISTENCE OF SIGNAL | EXISTENCE OF SIGNAL | EXISTENCE OF SIGNAL |
| OFF | EXISTENCE OF SIGNAL | UNDER DETECTION | EXISTENCE OF SIGNAL |
| OFF | EXISTENCE OF SIGNAL | OFF | EXISTENCE OF SIGNAL |
| OFF | UNDER DETECTION | EXISTENCE OF SIGNAL | EXISTENCE OF SIGNAL |
| OFF | UNDER DETECTION | UNDER DETECTION | UNDER DETECTION |
| OFF | UNDER DETECTION | OFF | UNDER DETECTION |
| OFF | OFF | EXISTENCE OF SIGNAL | EXISTENCE OF SIGNAL |
| OFF | OFF | UNDER DETECTION | UNDER DETECTION |
| OFF | OFF | OFF | NO IMPLEMENTATION OF DETECTION |

FIG. 7

| Spre1 (PREAMBLE DETECTION) | Srs1 (RSSI DETECTION) | Snd1 (NOISE DETECTION) | Sdi1 (OUTPUT OF JUDGMENT UNIT) |
|---|---|---|---|
| DETECTION OF NO-EXISTENCE OF SIGNAL | | | DETECTION OF NO-EXISTENCE OF SIGNAL |
| UNDER DETECTION | DETECTION OF NO-EXISTENCE OF SIGNAL | DETECTION OF NO-EXISTENCE OF SIGNAL | DETECTION OF NO-EXISTENCE OF SIGNAL |
| UNDER DETECTION | DETECTION OF NO-EXISTENCE OF SIGNAL | UNDER DETECTION | UNDER DETECTION |
| UNDER DETECTION | DETECTION OF NO-EXISTENCE OF SIGNAL | OFF | DETECTION OF NO-EXISTENCE OF SIGNAL |
| UNDER DETECTION | UNDER DETECTION | DETECTION OF NO-EXISTENCE OF SIGNAL | UNDER DETECTION |
| UNDER DETECTION | UNDER DETECTION | UNDER DETECTION | UNDER DETECTION |
| UNDER DETECTION | UNDER DETECTION | OFF | UNDER DETECTION |
| UNDER DETECTION | OFF | DETECTION OF NO-EXISTENCE OF SIGNAL | DETECTION OF NO-EXISTENCE OF SIGNAL |
| UNDER DETECTION | OFF | UNDER DETECTION | UNDER DETECTION |
| UNDER DETECTION | OFF | OFF | UNDER DETECTION |
| OFF | DETECTION OF NO-EXISTENCE OF SIGNAL | DETECTION OF NO-EXISTENCE OF SIGNAL | DETECTION OF NO-EXISTENCE OF SIGNAL |
| OFF | DETECTION OF NO-EXISTENCE OF SIGNAL | UNDER DETECTION | UNDER DETECTION |
| OFF | DETECTION OF NO-EXISTENCE OF SIGNAL | OFF | DETECTION OF NO-EXISTENCE OF SIGNAL |
| OFF | UNDER DETECTION | DETECTION OF NO-EXISTENCE OF SIGNAL | UNDER DETECTION |
| OFF | UNDER DETECTION | UNDER DETECTION | UNDER DETECTION |
| OFF | UNDER DETECTION | OFF | UNDER DETECTION |
| OFF | OFF | DETECTION OF NO-EXISTENCE OF SIGNAL | DETECTION OF NO-EXISTENCE OF SIGNAL |
| OFF | OFF | UNDER DETECTION | UNDER DETECTION |
| OFF | OFF | OFF | NO IMPLEMENTATION OF DETECTION |

FIG. 8

| Sen1 (RESULT OF JUDGMENT) | Sdi1 (RESULT OF JUDGMENT) | Ssn1 (RESULT OF SELECTION) |
|---|---|---|
| EXISTENCE OF SIGNAL | UNDER DETECTION | <u>EXISTENCE OF SIGNAL</u> |
| | NO IMPLEMENTATION OF DETECTION | <u>EXISTENCE OF SIGNAL</u> |
| UNDER DETECTION | DETECTION OF NO-EXISTENCE OF SIGNAL | <u>DETECTION OF NO-EXISTENCE OF SIGNAL</u> |
| | UNDER DETECTION | UNDER DETECTION |
| | NO IMPLEMENTATION OF DETECTION | UNDER DETECTION |

FIG. 9

WIRELESS COMMUNICATION APPARATUS

CROSS-REFERENCE TO RELATED APPLICATION

This application is based upon and claims the benefit of priority from the prior Japanese Patent Application No. 2012-061937, filed on Mar. 19, 2012, the entire contents of which are incorporated herein by reference.

FIELD

An embodiment described herein relates to a wireless communication apparatus.

BACKGROUND

Many wireless communication apparatuses employ intermittent operation. The intermittent operation stops the apparatuses when input-output signals do not exist. The intermittent operation sets the apparatuses to a standby mode to reduce their consumption current. An intermittent reception permits an RF unit or a microcomputer to operate during the intermittent reception. The intermittent reception sets the microcomputer to a sleep mode during signal waiting.

The wireless communication apparatuses for keyless entry have a standby period longer than an operating period. The wireless communication apparatuses for keyless entry have a data-transfer amount smaller than that of a common data-communication system. Wireless signals are transmitted from mobile phones for keyless entry. Received signals are not necessarily detected during an intermittent reception period. For this reason, the intermittent operation makes it difficult to shorten an intermittent reception period and reduce consumption current.

BRIEF DESCRIPTION OF THE DRAWINGS

FIG. 7 shows a truth table for explaining outputs of a first judgment unit according to the first embodiment;

FIG. 8 shows a truth table for explaining outputs of a second judgment unit according to the first embodiment;

FIG. 9 shows a truth table for explaining outputs of a selection circuit according to the first embodiment;

DETAILED DESCRIPTION

Figure 1:
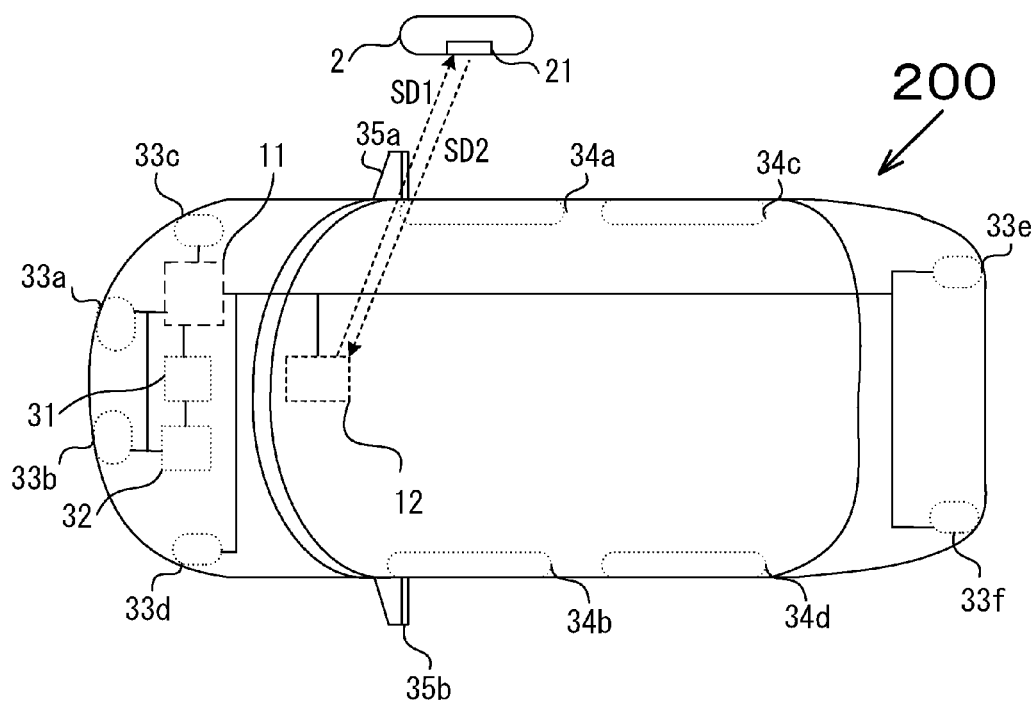
FIG. 1 is a block diagram showing a schematic configuration of a vehicle that installs intermittent reception according to a first embodiment.

According to an embodiment, a wireless communication apparatus includes a control unit and an RF unit. The control unit produces a first control signal and a second control signal. The first control signal is to set an intermittent reception period. The second control signal is to control a start-up of reception of a wireless signal. The RF unit includes a transmission unit and a reception unit. The transmission unit transmits the wireless signal. The reception unit implements reception processing after receiving the wireless signal. The intermittent reception period is set in accordance with the first control signal. The RF unit is set to a reception standby mode in accordance with the second control signal. When the reception processing is implemented during the intermittent reception period, the RF unit stops in accordance with an instruction of the control unit after the reception processing signal is outputted, the intermittent reception period is awoken. When the reception processing exceeds the intermittent reception period, the RF unit continues the reception, and stops in accordance with the instruction of the control unit after the reception processing signal is outputted.

Embodiments will be described with reference to drawings. In the drawings, the same reference numerals denote the same or similar portions.

Figure 2:
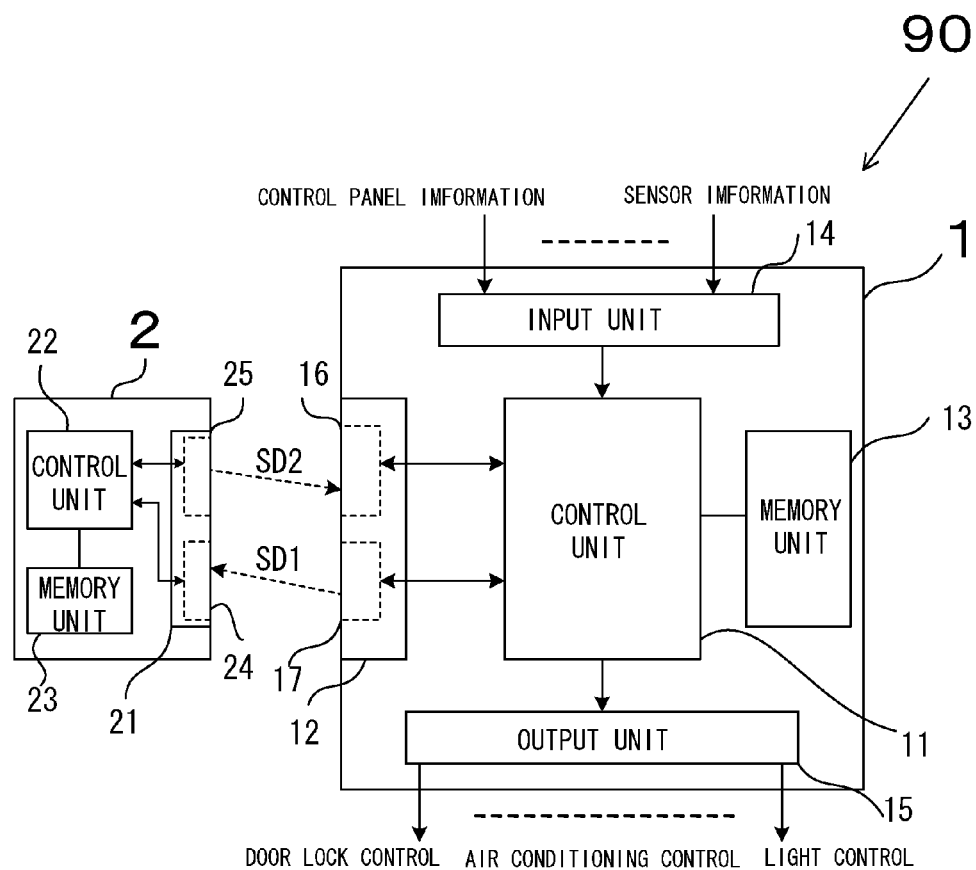
FIG. 2 is a block diagram showing a configuration of a wireless communication apparatus that performs intermittent reception according to the first embodiment.

A wireless communication apparatus according to an embodiment will be described with reference to drawings. FIG. 1 is a block diagram showing a schematic configuration of a vehicle that implements an intermittent reception function. FIG. 2 is a block diagram showing a configuration of a wireless communication apparatus that implements intermittent reception. The embodiment shortens an intermittent reception period in accordance with signals to reduce consumption current. The signals are detected at an RF unit of a control device in the wireless communication apparatus installed in a vehicle.

As shown in FIG. 1, a vehicle 200 includes a control unit 11, an RF unit 12, an engine 31, an air conditioner 32, lamps 33a to 33f, doors 34a to 34d, a mirror 35a, and a mirror 35b. The vehicle 200 wirelessly communicates with a mobile device 2 for keyless entry.

In the vehicle 200 for keyless entry, unlocking of the doors 34a to 34d, lighting of the lamps 33a to 33f, starting of the engine 31 or the air conditioner 32, etc. is controlled in accordance with a wireless communication signal SD2. The RF unit 21 of the mobile device 2 transmits the wireless communication signal SD2 to the RF unit 12 of the vehicle 200. The RF unit 12 of the vehicle 200 transmits a wireless communication signal SD1 to the RF unit 21 of the mobile device 2. The wireless communication signal SD1 includes sensor information of the inside of the vehicle 200.

Alternatively, the vehicle 200 may include two or more RF units 12. For example, the vehicle 200 may include four RF units 12, each being installed at four corners of the vehicle 200.

As shown in FIG. 2, a wireless communication apparatus 90 wirelessly communicates for keyless entry in the vehicles 200.

The wireless communication apparatus 90 includes a control device 1 and the mobile device 2. The control device 1 is installed inside the vehicles 200. The control device 1 includes the control unit 11, the RF unit 12, a memory unit 13, an input unit 14, and an output unit 15. The mobile device 2 is installed outside the vehicles 200. The mobile device 2 includes the RF unit 21, the control unit 22, and a memory unit 23.

The control unit 11 totally controls the RF unit 12, a memory unit 13, an input unit 14, and an output unit 15. The RF unit 12 includes a reception unit 16 and a transmission unit 17. The memory unit 13 stores various pieces of information (about the inside and outside of the vehicle 200) outputted from the control unit 11. The input unit 14 receives sensor information from a control panel or a sensor to output the sensor information to the control unit 11. The output unit 15 receives a control signal from the control unit 11 to transmit the control signal into the vehicles 200, thereby controlling the door lock, the air condition, the lighting, and the like, for example.

The control unit 22 totally controls the RF unit 21 and the memory unit 23. The RF unit 21 includes a reception unit 24 and a transmission unit 25. The memory unit 23 stores various pieces of information outputted from the control unit 22.

The wireless communication signal SD2 is in a UHF band. The transmission unit 25 transmits the wireless communication signal SD2 to a reception unit 16. The wireless communication signal SD1 is in a LF band. The transmission unit 17 transmits the wireless communication signal SD1 to the reception unit 24.

Figure 3:
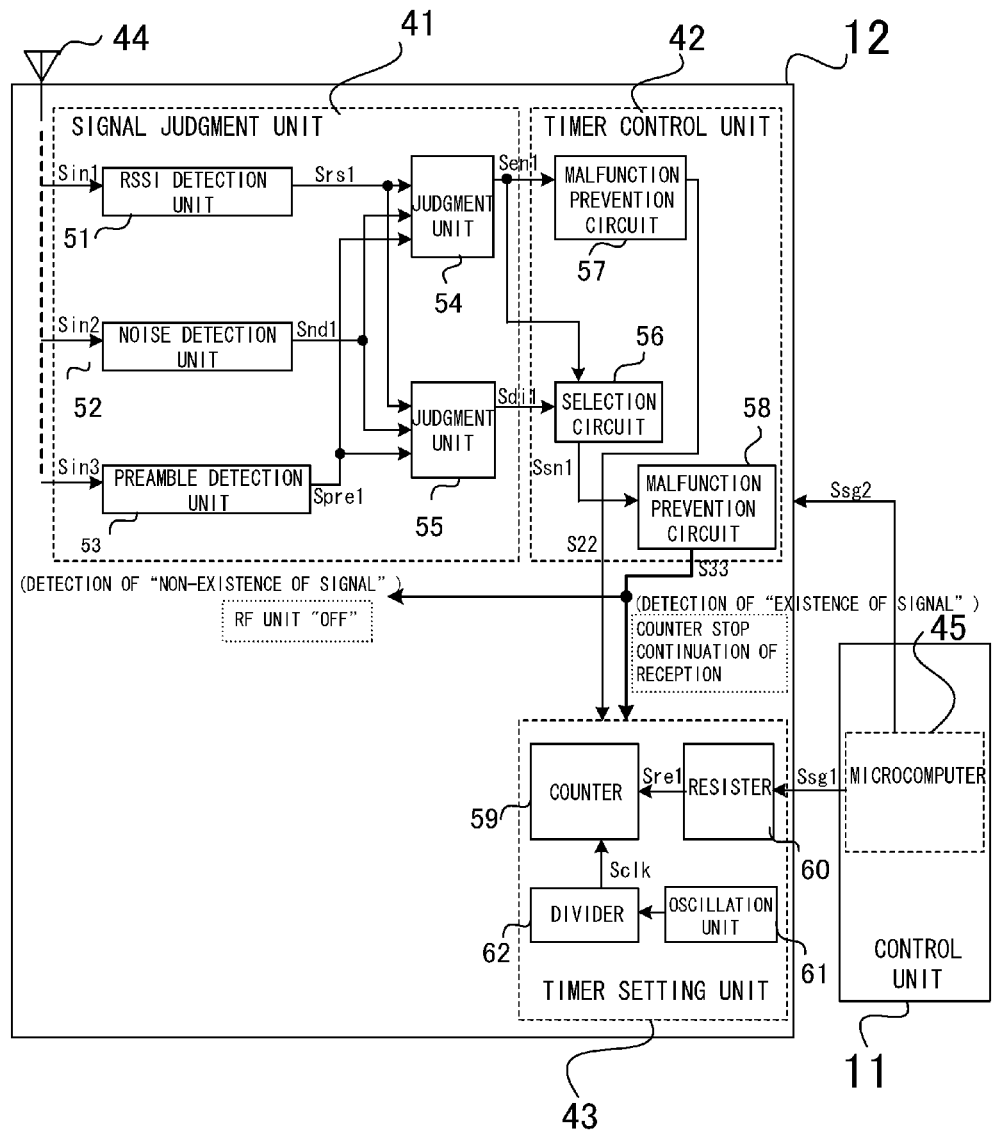
FIG. 3 is a block diagram showing a schematic configuration of a control device according to the first embodiment.
Figure 4:
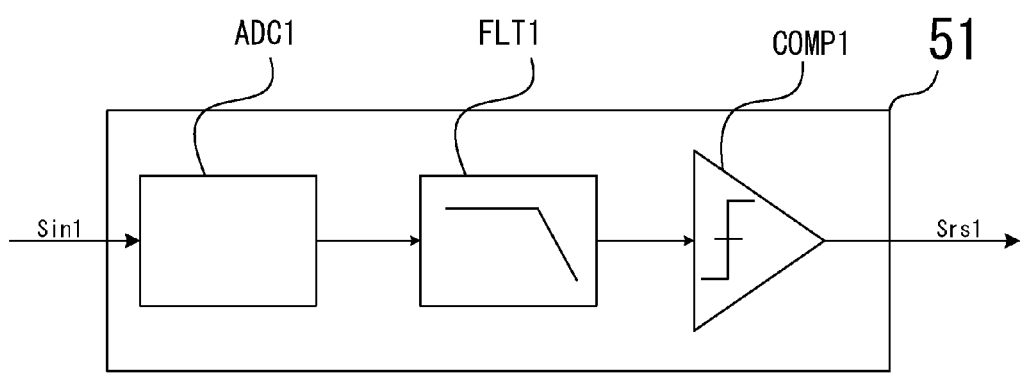
FIG. 4 is a block diagram showing a configuration of an RSSI detection unit according to the first embodiment.
Figure 5:
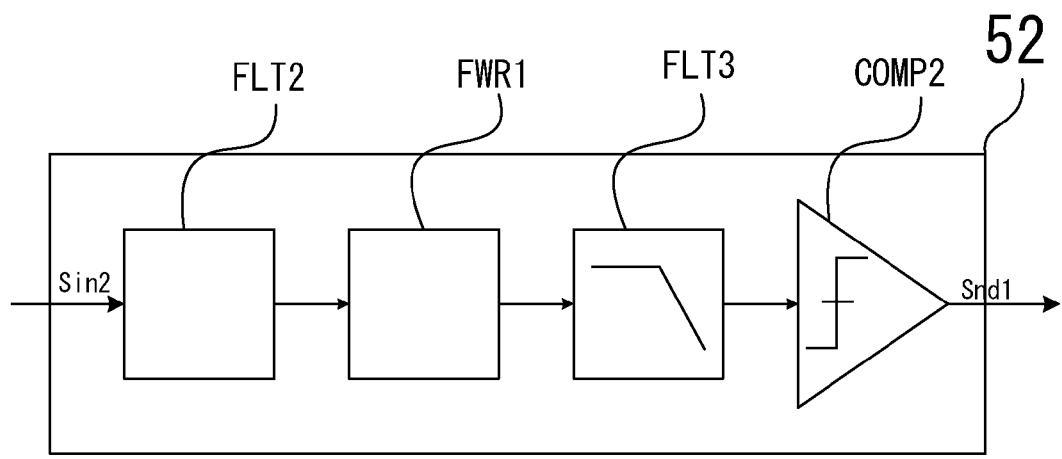
FIG. 5 is a block diagram showing a configuration of a noise detection unit according to the first embodiment.
Figure 6:
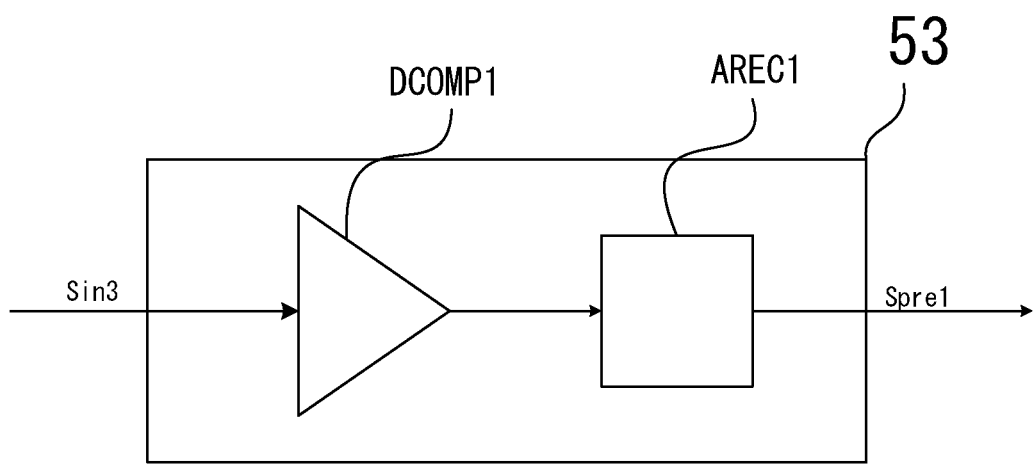
FIG. 6 is a circuit diagram showing a configuration of a preamble detection unit according to the first embodiment.

A control device of the wireless communication apparatus for keyless entry will be described with reference to FIGS. 3 to 8. FIG. 3 is a block diagram showing a schematic configuration of the control device. FIG. 4 is a block diagram showing a configuration of an RSSI detection unit. FIG. 5 is a block diagram showing a configuration of a noise detection unit. FIG. 6 is a circuit diagram showing a configuration of a preamble detection unit. FIG. 7 shows a truth table for explaining outputs of the first judgment unit. FIG. 8 shows a truth table for explaining outputs of the second judgment unit. FIG. 9 shows a truth table for explaining outputs of a selection circuit.

As shown in FIG. 3, the wireless communication for keyless entry involves the RF unit 12 and the control unit 11. The RF unit 12 includes a signal judgment unit 41, a timer control unit 42, a timer setting unit 43, and an antenna 44. The control unit 11 includes a microcomputer 45.

The microcomputer 45 outputs a control signal (first control signal) Ssg1 to the timer setting unit 43. The control signal is to set an intermittent reception period. The microcomputer 45 transmits a control signal Ssg2 (second control signal) to the RF unit 12. The control signal Ssg2 is to control the operation of the RF unit 12.

The signal judgment unit 41 determines existence or no-existence of the wireless communication signal SD2. The wireless communication signal SD2 is transmitted into the reception unit 16 through the antenna 44. The timer setting unit 43 sets an intermittent reception period in accordance with the control signal Ssg1 (first control signal). The timer control unit 42 stops a counter 59 of the timer setting unit 43 to continue reception when the signal judgment unit 41 determines "existence of signal," in accordance with judgment result signals Sen1 (first judgment result signal) and Sdi1 (second judgment result signal). When the signal judgment unit 41 determines "no-existence of signal," the RF unit 12 is stopped.

The signal judgment unit 41 includes an RSSI (received signal strength indicator) detection unit 51, a noise detection unit 52, a preamble detection unit 53, judgment units 54 (first judgment unit) and 55 (second judgment unit).

The RSSI detection unit 51 receives an input signal Sin1 to output a detection signal Srs1 (first detection signal).

As shown in FIG. 4, the RSSI detection unit 51 includes an A/D converter ADC1, a filter FLT1, and a comparator COMP1, for example.

The A/D converter ADC1 receives an input signal Sin1 from an IF stage (not shown) of the reception unit 16 to perform analog-to-digital conversion. The filter FLT1 cuts off any signal bands other than a predetermined signal band transmitted from the A/D converter ADC1. The comparator COMP1 receives a signal from the filter FLT1 to transmit a detection signal Srs1 (first detection signal) with a high level when the signal from the filter FLT1 has a level higher than a predetermined threshold. When the signal from the filter FLT1 has a level not higher than the predetermined threshold, the comparator COMP1 transmits a detection signal Srs1 (first detection signal) with a low level.

The noise detection unit 52 receives an input signal Sin2 through the antenna 44 to output a detection signal Snd1 (second detection signals).

As shown in FIG. 5, the noise detection unit 52 includes a filter FLT2, a full wave rectifier circuit FWR1, a filter FLT3, and a comparator COMP2, for example.

The filter FLT2 receives an input signal Sin2 from an integrator (not shown) at the IF stage in the reception unit 16 to cut off any signal bands other than a predetermined signal band of the input signal Sin2. The full wave rectifier circuit FWR1 receives a signal from the filter FLT2 to implement full-wave rectification of the signal. The filter FLT3 receives a signal from the full wave rectifier circuit FWR1 to cut off any signal bands other than a predetermined signal band of the signal. The comparator COMP2 receives a signal from the filter FLT3 to transmit a low-level detection signal Snd1 (second detection signal), for example, when the signals from the filter FLT3 has a level higher than a predetermined threshold. When the signal from the filter FLT3 has a level not higher than the predetermined threshold, the comparator COMP2 outputs a high-level detection signal Snd1 (second detection signal).

A preamble detection unit 53 receives an input signal Sin3 through the antenna 44 etc. to transmit a detection signal Spre1 (third detection signal).

As shown in FIG. 6, the preamble detection unit 53 includes a data comparator DCOMP1 and a recognition circuit AREC1, for example.

The data comparator DCOMP1 receives an input signal Sin3 to binarize (low level/high level) data of the input signals Sin3. The input signal Sin3 is transmitted from the IF stage (not shown) of the reception unit 16. The recognition circuit AREC1 receives a signal from the data comparator DCOMP1 to recognize the signal by a predetermined recognition method.

The judgment unit 54 receives a detection signal Srs1, a detection signal Snd1, and a detection signal Spre1 to generate a judgment result signal Sen1 by logical operation. The judgment unit 54 detects "existence of signal."

As shown in FIG. 7, the logical operation in the judgment unit 54 is set to have the following priority order as:

$$Spre1 > Snd1 > Srs1 \qquad \text{Formula (1),}$$

having a preference for a detection signal Spre1.

When a detection signal Spre1 exists, the judgment unit 54 outputs a judgment result signal Sen1 independently of detection signals Snd1 and Srs1. The judgment result signal Sen1 shows "existence of signal." When a detection signal Spre1 is under detection, the judgment unit 54 outputs a judgment result signal Sen1 to show "under detection," independently of detection signals Snd1 and Srs1.

When a detection signal Spre1 is OFF and when a detection signal Snd1 exists, the judgment unit 54 outputs a judgment result signal Sen1 to show "existence of signal." When a detection signal Spre1 is OFF, when a detection signal Snd1 is under detection, and when a detection signal Srs1 exists, the judgment unit 54 outputs a judgment result signal Sen1 to show "existence of signal." When a detection signal Spre1 is OFF, when a detection signal Snd1 is under detection, and when a detection signal Srs1 is under detection, the judgment unit 54 outputs a judgment result signal Sen1 to show "under detection." When a detection signal Spre1 is OFF, when a detection signal Snd1 is under detection, and when a detection signal Srs1 is OFF, the judgment unit 54 outputs a judgment result signal Sen1 to show "under detection." Here, "OFF" of a signal means "non-existence" of a signal.

When a detection signal Spre1 is OFF, when a detection signal Snd1 is OFF, and when a detection signal Srs1 exists, the judgment unit 54 outputs a judgment result signal Sen1 to show "existence of signal." When a detection signal Spre1 is OFF, when a detection signal Snd1 is OFF, and when a detection signal Srs1 is under detection, the judgment unit 54 outputs a judgment result signal Sen1 to show "under detection." When a detection signal Spre1 is OFF, when a detection signal Snd1 is OFF, and when a detection signal Srs1 is OFF, the judgment unit 54 outputs a judgment result signal Sen1 to show "no implementation of detection."

A judgment unit 55 receives a detection signal Srs1, a detection signal Snd1, and a detection signal Spre1 to generate a judgment result signal Sdi1 by logic operation. The judgment unit 55 detects "no-existence of signal."

As shown in FIG. 8, detection signals Spre1 have the highest priority among a detection signal Spre1 for detecting the preamble, a detection signal Snd1 for detecting noise, and a detection signal Srs1 for detecting RSSI.

When a detection signal Spre1 does not exist, the judgment unit 55 outputs a judgment result signal Sdi1 to show "no-existence of signal" independent of a detection signal Snd1 and a detection signal Srs1. When a detection signal Spre1 is under detection, when a detection signal Srs1 does not exist, and when a detection signal Snd1 does not exist, the judgment unit 55 outputs a judgment result signal Sdi1 to show "no-existence of signal." When a detection signal Spre1 is under detection, when a detection signal Srs1 does not exist, and when a detection signal Snd1 is under detection, the judgment unit 55 outputs a judgment result signal Sdi1 to show "under detection." When a detection signal Spre1 is under detection, when a detection signal Srs1 does not exist, and when a detection signal Snd1 is OFF, the judgment unit 55 outputs a judgment result signal Sdi1 to show "no-existence of signal."

When a detection signal Spre1 is under detection, when a detection signal Srs1 is under detection, and when a detection signal Snd1 does not exist, the judgment unit 55 outputs a judgment result signal Sdi1 to show "under detection." When a detection signal Spre1 is under detection, when a detection signal Srs1 is under detection, and when a detection signal Snd1 is under detection, the judgment unit 55 outputs a judgment result signal Sdi1 to show "under detection." When a detection signal Spre1 is under detection, when a detection signal Srs1 is under detection, and when a detection signal Snd1 is OFF, the judgment unit 55 outputs a judgment result signal Sdi1 to show "under detection."

When a detection signal Spre1 is under detection, when a detection signal Srs1 is OFF, and when a detection signal Snd1 does not exist, the judgment unit 55 outputs a judgment result signal Sdi1 to show "no-existence of signal." When a detection signal Spre1 is under detection, when a detection signal Srs1 is OFF, and when a detection signal Snd1 is under detection, the judgment unit 55 outputs a judgment result signal Sdi1 to show "under detection." When a detection signal Spre1 is under detection, when a detection signal Srs1 is OFF, and when a detection signal Snd1 is OFF, the judgment unit 55 outputs a judgment result signal Sdi1 to show "under detection."

When a detection signal Spre1 is OFF, when a detection signal Srs1 does not exist, and when a detection signal Snd1 does not exist, the judgment unit 55 outputs a judgment result signal Sdi1 to show "no-existence of signal." When a detection signal Spre1 is OFF, when a detection signal Srs1 does not exist, and when a detection signal Snd1 is under detection, the judgment unit 55 outputs a judgment result signal Sdi1 to show "under detection." When a detection signal Spre1 is OFF, when a detection signal Srs1 does not exist, and when a detection signal Snd1 is OFF, the judgment unit 55 outputs a judgment result signal Sdi1 to show "no-existence of signal."

When a detection signal Spre1 is OFF, when a detection signal Srs1 is OFF, and when a detection signal Snd1 does not exist, the judgment unit 55 outputs a judgment result signal Sdi1 to show "no-existence of signal." When a detection signal Spre1 is OFF, when a detection signal Srs1 is OFF, and when a detection signal Snd1 is under detection, the judgment unit 55 outputs a judgment result signal Sdi1 to show "under detection." When a detection signal Spre1 is OFF, when a detection signal Srs1 is OFF, and when a detection signal Snd1 is OFF, the judgment unit 55 outputs a judgment result signal Sdi1 to show "no implementation of detection."

The timer setting unit 43 includes the counter 59, a register 60, an oscillation unit 61, and a frequency divider circuit 62.

The register 60 receives a control signal Ssg1 from the microcomputer 45 to transmit a signal Sre1 to determine an intermittent reception period. The oscillation unit 61 generates an oscillation signal. The frequency divider circuit 62 generates a clock signal Sclk in accordance with the oscillation signal from the oscillation unit 61. The counter 59 is a down counter with a preset, and sets an intermittent reception period of 2 to $2^{255}$ (ms), for example. The counter 59 receives signals Sre1 to count down on the basis of the clock signal Sclk.

The timer control unit 42 includes a selection circuit 56, malfunction prevention circuits 57 and 58.

The selection circuit 56 receives a judgment result signal Sen1 from the judgment unit 54 and a judgment result signal Sdi1 from the judgment unit 55 to implement signal selection. The selection circuit 56 preferentially selects a judgment result signal Sen1.

As shown in FIG. 9, when a judgment result signal Sen1 exists and when a judgment result signal Sdi1 is under detection, the selection circuit 56 outputs a selection signal Ssn1 to show "existence of signal." When a judgment result signal Sen1 exists and when a judgment result signal Sdi1 is under no implementation of detection, the selection circuit 56 outputs a selection signal Ssn1 to show "existence of signal."

When a judgment result signal Sen1 is under detection and when a judgment result signal Sdi1 does not exist, the selection circuit 56 outputs a selection signal Ssn1 to show "no-existence of signal." When a judgment result signal Sen1 is under detection and when a judgment result signal Sdi1 is under detection, the selection circuit 56 outputs a selection signal Ssn1 to show "under detection." When a judgment result signal Sen1 is under detection and when a judgment result signal Sdi1 is under no implementation of detection, the selection circuit 56 outputs a selection signal Ssn1 to show "under detection."

The malfunction prevention circuit 57 receives a judgment result signal Sen1 from the judgment unit 54 to output a signal S22. When a judgment result signal Sen1 can cause a malfunction due to noises, the malfunction prevention circuit 57 latches the judgment result signal Sen1 to prevent passage of the judgment result signal Sen1. The malfunction prevention circuit 58 receives a selection signal Ssn1 from the selection circuit 56 to output a signal S33. When a selection signal Ssn1 can cause a malfunction due to noises, the malfunction prevention circuit 58 latches the selection signal Ssn1 to prevent passage of the selection signal Ssn1.

The counter 59 stops an operation to continue signal reception for "existence of signal", in accordance with signals S22 from the malfunction prevention circuit 57 and signals S33 from the malfunction prevention circuit 58. No existence of signal causes the RF unit 12 to be OFF.

When a signal S22 and a signal S33 are under detection or under no implementation of detection, the RF unit 12 is set to a standby mode during an intermittent reception period or to an "OFF" mode of waiting instruction from the microcomputer outside an intermittent reception period.

Figure 10A:
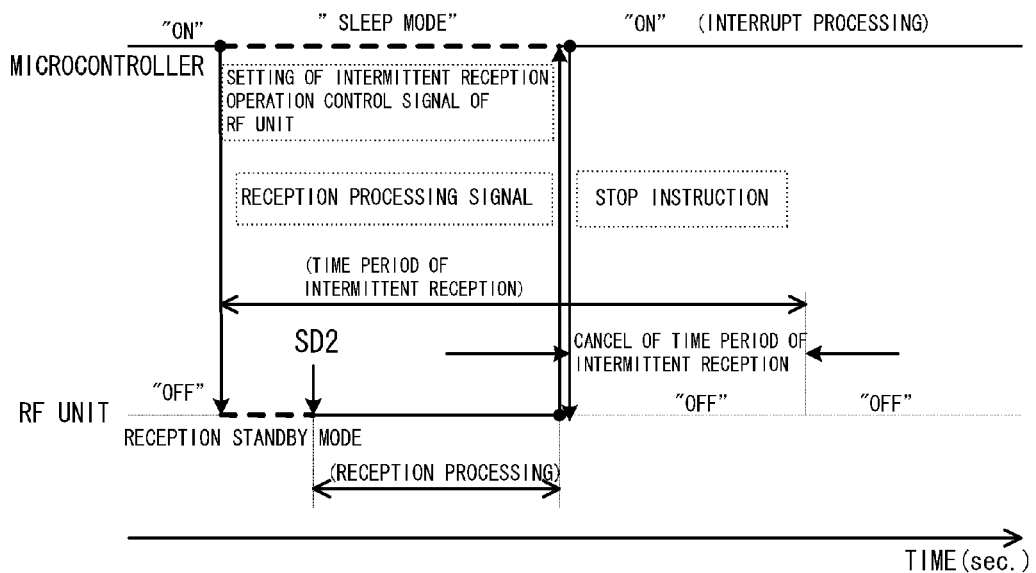
FIGS. 10A and 10B show timing charts showing operation of the wireless communication apparatus according to a second embodiment.
Figure 10B:
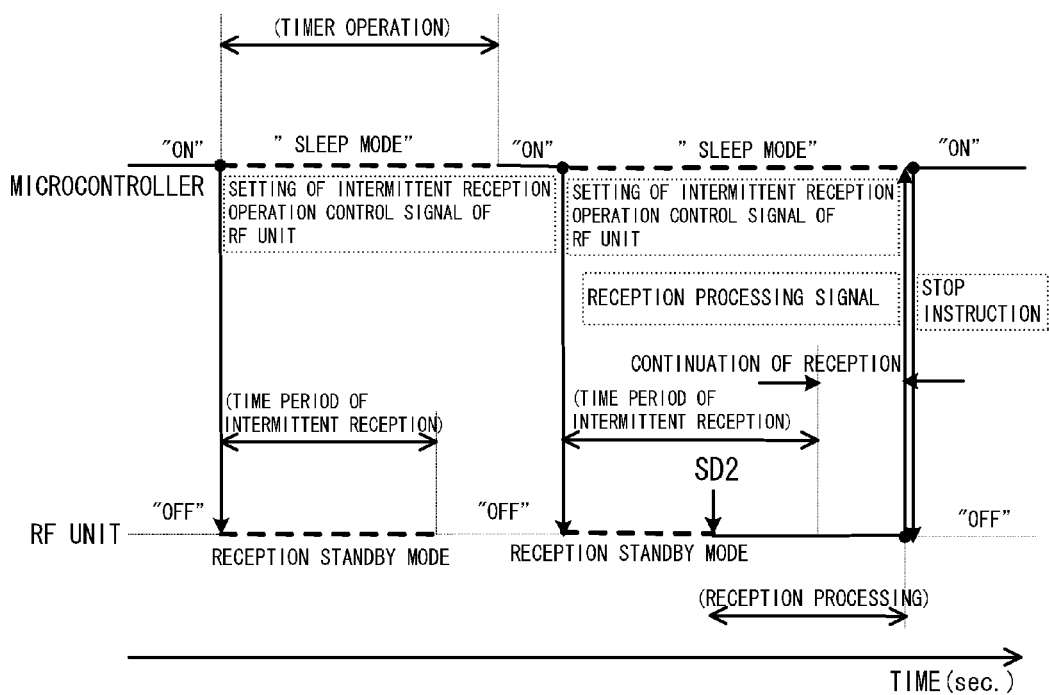

Intermittent reception operation of the wireless communication apparatus will be described with reference to FIGS. 10A and 10B. FIGS. 10A and 10B show timing charts showing operation of the wireless communication apparatus. FIG. 10A shows that a wireless communication signal SD2 has been inputted during an intermittent reception period. FIG. 10B shows that a period of reception processing is longer than the intermittent reception period.

As shown in FIG. 10A, the intermittent reception period is set to a range from 10 ms to 20 ms in accordance with a control signal Ssg1 from the microcomputer 45. The RF unit 12 is set to a reception standby mode from an "OFF" mode in accordance with a control signal Ssg2. The microcomputer 45 shifts to a sleep mode after control signals Ssg1 and Ssg2 are outputted.

The RF unit 12 receives a wireless communication signal SD2 during an intermittent reception period to start reception processing after checking the existence or no-existence of the wireless communication signals SD2. The RF unit 12 transmits a reception processing signal to the microcomputer 45. Having received the reception processing signal, the microcomputer 45 returns to an operating mode from a sleep mode to perform interrupt processing. Having finished receiving the reception processing signal, the microcomputer 45 transmits a stop instruction to the RF unit 12. The RF unit 12 stops an operation in accordance with the stop instruction, thereby lifting the intermittent reception period (the intermittent reception period is awoken).

As shown in FIG. 10B, the microcomputer 45 returns to an operating mode from a sleep mode after a predetermined period set by timer operation has passed. The microcomputer 45 outputs control signals Ssg1 and Ssg2 to the RF unit 12. The RF unit 12 receives a wireless communication signal SD2 during an intermittent reception period to start reception processing after checking the existence or no-existence of the wireless communication signals SD2. Having determined that the reception processing exceeds an intermittent reception period, the RF unit 12 extends the intermittent reception period to continue reception. The RF unit 12 transmits a reception processing signal to the microcomputer 45. The microcomputer 45 receives the reception processing signal to return to an operating mode from a sleep mode and to implement interrupt processing. Having received the reception processing signal, the microcomputer 45 transmits a stop instruction to the RF unit 12. The RF unit 12 stops an operation in accordance with the stop instruction (the intermittent reception period is awoken).

As described above, the wireless communication apparatus 90 of the embodiment is used for wireless communication for keyless entry. The wireless communication apparatus 90 includes the control device 1 and the mobile device 2 to implement the wireless communication for keyless entry in the vehicle 200. The control device 1 is installed in the vehicles 200. The control device 1 includes the control unit 11, the RF unit 12, the memory unit 13, the input unit 14, and the output unit 15. The mobile device 2 is installed outside the vehicles 200. The mobile device 2 includes the RF unit 21, the control unit 22, and the memory unit 23. The RF unit 12 includes the signal judgment unit 41, the timer control unit 42, the timer setting unit 43, and the antenna 44. The control unit 11 includes the microcomputer 45. The microcomputer 45 outputs a control signal Ssg1 to the timer setting unit 43 to determine an intermittent reception period. The microcomputer 45 outputs a control signal Ssg2 to the RF unit 12 to control operation of the RF unit 12. The signal judgment unit 41 determines the existence or no-existence of wireless communication signals SD2 inputted into the reception unit 16 through the antenna 44. The timer setting unit 43 determines an intermittent reception period in accordance with a control signal Ssg1. The timer control unit 42 stops the counter 59 of the timer setting unit 43 to continue reception when the signal judgment unit 41 determines existence of wireless communication signals SD2 in accordance with judgment result signals Sen1 and Sdi1. When the signal judgment unit 41 determines no-existence of wireless communication signal SD2, the RF unit 12 is stopped.

Thus, the wireless communication apparatus 90 enables it to shorten an intermittent reception period and reduce consumption current thereof. The wireless communication apparatus 90 also enables the microcomputer 45 to reduce a total control over the RF unit 12. The RF unit 12 is capable of continuing reception or stopping an operation to thereby speed up the reception processing.

Alternatively, the embodiment may employ CPUs (central processing unit), MPUs (microprocessor unit), and the like, instead of the microcomputer 45.

Figure 11:
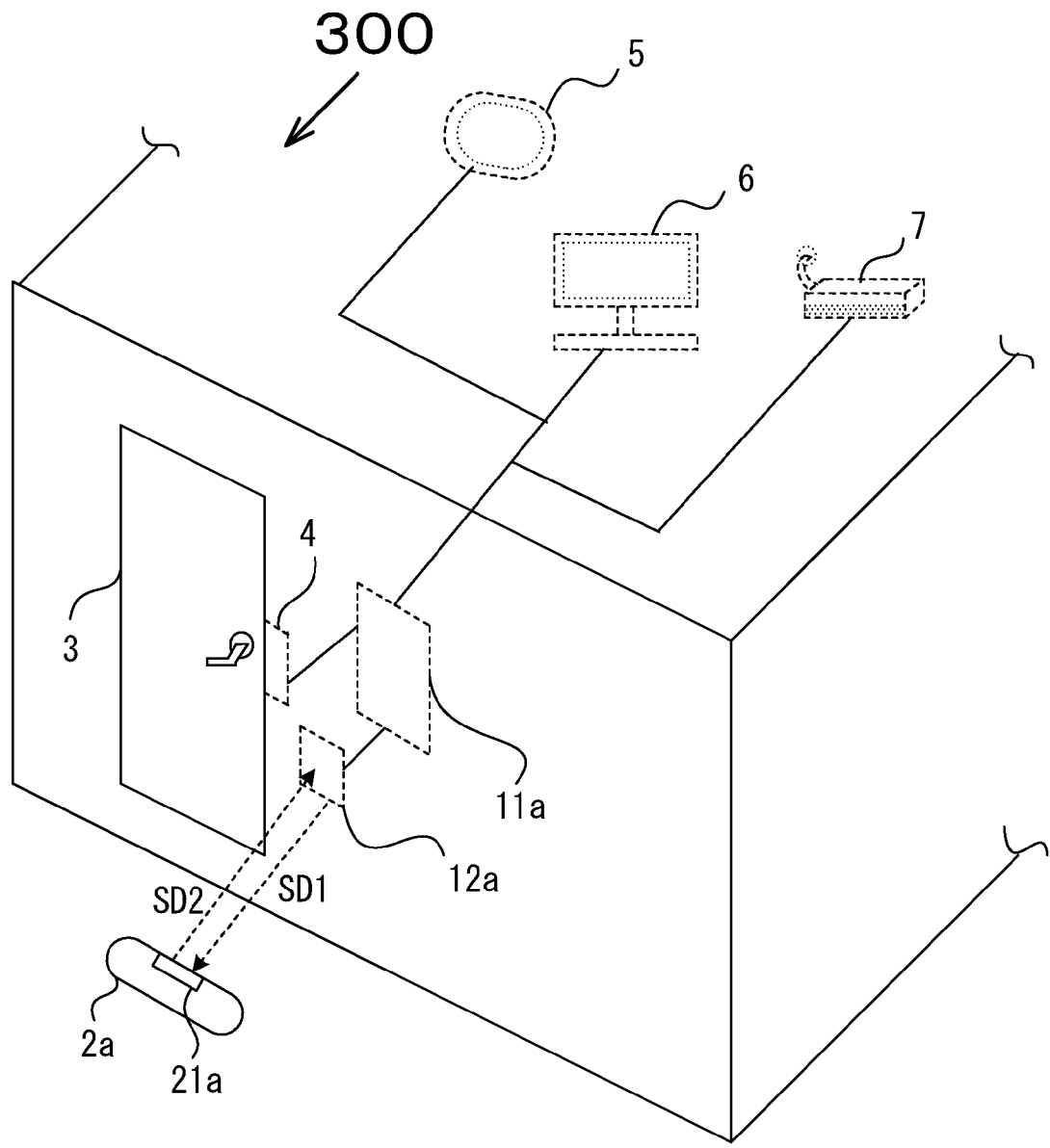
FIG. 11 is a block diagram showing a schematic configuration of a house where intermittent reception is performed according to the second embodiment.
Figure 12:
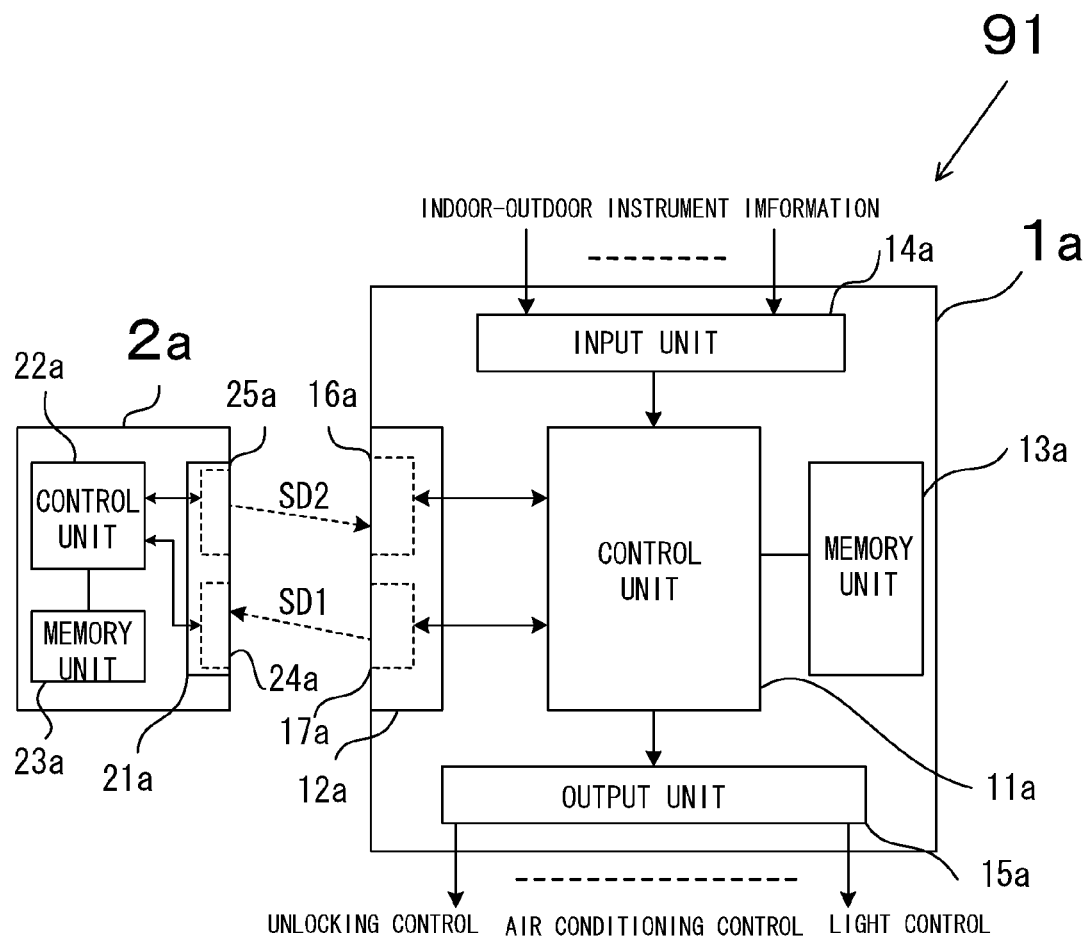
FIG. 12 is a block diagram showing a configuration of the wireless communication apparatus to perform the intermittent reception according to the second embodiment.

A wireless communication apparatus according to a second embodiment will be described with reference to drawings. FIG. 11 is a block diagram showing a schematic configuration of a house where intermittent reception is implemented. FIG. 12 is a block diagram showing a configuration of the wireless communication apparatus to implement the intermittent reception. The second embodiment shortens an intermittent reception period to reduce consumption current in accordance with signal detection results detected by an RF unit of a control device of the wireless communication apparatus.

As shown in FIG. 11, the house 300 includes a door 3, an unlocking control unit 4, a light 5, a TV 6, an air conditioner 7, a control unit 11a, and an RF unit 12a. The house 300 wirelessly communicates for keyless entry with the mobile device 2a.

In the house 300 for keyless entry, unlocking of the door 3, lighting of the light 5, starting of the TV 6 or the air conditioner 7 is controlled in accordance with a wireless communication signal SD2 that is transmitted from the RF unit 21a of the mobile device 2a to the RF unit 12a of the house 300. The RF unit 12a of the house 300 transmits a wireless communication signal SD1 to the RF unit 21a of the mobile device 2a. The wireless communication signal SD1 includes information of the house 300.

As shown in FIG. 12, the wireless communication apparatus 91 implements wireless communication for keyless entry in the house 300.

The wireless communication apparatus 91 includes a control device 1a and a mobile device 2a. The house 300 is provided with the control device 1a including a control unit 11a, an RF unit 12a, a memory unit 13a, an input unit 14a, and an output unit 15a. The mobile device 2a is provided outside the house 300. The mobile device 2a includes an RF unit 21a, a control unit 22a, and a memory unit 23a.

The control unit 11a totally controls an RF unit 12a, a memory unit 13a, an input unit 14a, and an output unit 15a. The RF unit 12a includes a reception unit 16a and a transmission unit 17a. The memory unit 13a stores various pieces of information relating to the inside and outside of the house 300. The pieces of the information are outputted from the control unit 11a. The input unit 14a receives the pieces of the information to transmit the pieces of the information to the control unit 11a. The output unit 15a receives a control signal from the control unit 11a to transmit the signal to the inside of the house 300. Thus, the output unit 15a unlocks the door with the unlocking control unit 4 and controls the air conditioner and the light.

The control unit 22a totally controls the RF unit 21a and the memory unit 23a. The RF unit 21a includes a reception unit 24a and a transmission unit 25a. The memory unit 23a stores various pieces of information from the control unit 22a.

The transmission unit 25a transmits a wireless communication signal SD2 to the reception unit 16a. The transmission unit 17a transmits a wireless communication signal SD1 to the reception unit 24a.

The control unit 11a and the RF unit 12a of the wireless communication apparatus 91 have the same configurations and the same operation as those of the wireless communication apparatus 90 according to the first embodiment. Explanations will not be repeated.

As described above, the embodiment employs the wireless communication apparatus 91 including the control device 1a and the mobile device 2a to wirelessly communicate for keyless entry with the house 300. The house 300 is provided with the control device 1a including the control unit 11a, the RF unit 12a, the memory unit 13a, the input unit 14a, and the output unit 15a. The mobile device 2a includes the RF unit 21a, the control unit 22a, and the memory unit 23a; and is provided outside the house 300.

Thus, the embodiment enables it to shorten the intermittent reception period for keyless entry and reduce the consumption current of the wireless communication apparatus 91.

The embodiment has been described with reference to the wireless communication apparatus for keyless entry. However, the embodiment is not limited to this. The embodiment can be used for more common wireless communication apparatuses or devices having intermittent receiving functions.

In the first embodiment, the RF unit 12 and the control unit 11 of the vehicle 200 are applied. Alternatively, the RF unit 21 and the control unit 22 may be applied in the first embodiment. In the second embodiment, the RF unit 12a and the control unit 11a of the house 300 are applied. Alternatively, the RF unit 21a and the control unit 22a of the mobile device 2a may be applied in the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
a control unit which generates a first control signal and a second control signal, the first control signal setting an intermittent reception period, the second control signal controlling start-up of reception of a first wireless signal; and
a RF unit including a transmission unit and a reception unit, the transmission unit transmitting a second wireless signal, the reception unit implementing reception processing after receiving the first wireless signal, the intermittent reception period being set in accordance with the first control signal, the RF unit being set to a reception standby mode in accordance with the second control signal,
wherein:
when the reception processing is implemented during the intermittent reception period, the RF unit stops in accordance with an instruction of the control unit after a reception processing signal is outputted, and the intermittent reception period is interrupted,
when the reception processing exceeds the intermittent reception period, the RF unit continues the reception, and stops in accordance with the instruction of the control unit after the reception processing signal is outputted,
the RF unit includes a signal judgment unit, a timer setting unit, and a timer control unit,
the signal judgment unit determines existence or non-existence of the first wireless signal,
the timer setting unit includes a counter to set the intermittent reception period in accordance with the first control signal,
the timer control unit stops the counter to continue the reception processing, when the signal judgment unit outputs a judgment result signal indicating existence of the first wireless signal, and the timer control unit stops the RF unit when the signal judgment unit outputs a judgment result signal indicating non-existence of the first wireless signal,
the signal judgment unit includes an RSSI detection unit, a noise detection unit, a preamble detection unit, a first judgment unit, and a second judgment unit,
the first judgment unit receives a first detection signal from the RSSI detection unit, a second detection signal from the noise detection unit, and a third detection signal from the preamble detection unit, to determine, by logic operation processing, existence of the first wireless signal or non-existence of the first wireless signal, and
the second judgment unit receives the first detection signal, the second detection signal, and the third detection signal to determine, by logic operation processing, non-existence of the first wireless signal, a signal under detection, or no implementation of detection.

2. The apparatus according to claim 1,
wherein the RSSI detection unit includes an A/D converter, a first filter, and a first comparator, the A/D converter receiving a first input signal from an IF stage to implement analog-to-digital conversion, the first filter cutting off any signal bands other than a predetermined signal band of a signal from the A/D converter, and
wherein the first comparator receives a signal from the first filter to output the first detection signal with a high level when the signal from the first filter has a level higher than a predetermined threshold or to output the first detection signal with a low level when the signal from the first filter has a level lower than the predetermined threshold.

3. The apparatus according to claim 1,
wherein the noise detection unit includes a second filter, a full wave rectifier circuit, a third filter, and a second comparator, the second filter cutting off any signal bands other than a predetermined signal band of a second input signal from an integrator provided at an IF stage, the full wave rectifier circuit implementing full-wave rectification of a signal from the second filter, the third filter cutting off any signal bands other than a predetermined signal band of a signal from the full wave rectifier circuit, and
wherein the second comparator receives a signal from the third filter to output the second detection signal with a low level when the signal from the third filter has a level higher than a predetermined threshold or to output the second detection signal with a high level when the signal from the first filter has a level lower than the predetermined threshold.

4. The apparatus according to claim 1, wherein the preamble detection unit includes a data comparator and a recognition circuit, the data comparator receiving a third input signal from an IF stage to binarize the third input signal, and the recognition circuit recognizing a signal from the data comparator by a predetermined recognition method.

5. The apparatus according to claim 1, wherein the timer setting unit further includes a register, an oscillation unit, and a frequency divider circuit, the register receiving the first control signal to output a signal for determining the intermittent reception period to the counter, the oscillation unit generating an oscillation signal, and the frequency divider circuit receiving the oscillation signal to output a clock signal to the counter.

6. The apparatus according to claim 1,
wherein the timer control unit includes a selection circuit, a first malfunction prevention circuit, and a second malfunction prevention circuit, the selection circuit receiving a signal from the first judgment unit and a signal from the second judgment unit and preferentially selecting the signal from the first judgment unit, the first malfunction prevention circuit receiving the signal from the first judgment unit to prevent passage of the signal from the first judgment unit when the signal from the first judgment unit can cause a malfunction, and
wherein the second malfunction prevention circuit receives a signal from the selection circuit to prevent passage of the signal from the selection circuit when the signal from the selection circuit can cause a malfunction.

7. The apparatus according to claim 1, wherein the control unit includes any one of a microcomputer, a CPU and an MPU to generate the first control signal and the second control signal.

8. The apparatus according to claim 1, wherein the control unit shifts to a sleep mode after outputting the first and second control signals, and returns to an operating mode from the sleep mode after receiving the reception processing signal.

9. The apparatus according to claim 1, wherein the control unit returns to an operating mode from a sleep mode when a predetermined time has passed after the control unit shifted to the sleep mode.

10. The apparatus according to claim 1, further comprising:
a mobile device for keyless entry, the mobile device wirelessly communicating with the RF unit and outputting the first wireless signal to the reception unit of the RF unit.

11. The apparatus according to claim 5, wherein the counter is a down counter with a preset to count down in accordance with the clock signal when the counter receives the signal from the register.

12. The apparatus according to claim 10, wherein the apparatus is used for vehicles or houses.

13. The apparatus according to claim 10, wherein the apparatus is used for a vehicle and receives a signal from the mobile device to control at least one of unlocking doors of the vehicle, lighting lamps of the vehicle, starting an engine of the vehicle, and starting an air conditioner of the vehicle.

* * * * *